O. N. BRAINERD.
Evaporating Pan.

No. 34,236.

Patented Jan. 28, 1862.

Witnesses
J. W. Coombs
Geo. Reed

Inventor
O. N. Brainerd
per Munn & Co.
Attys.

UNITED STATES PATENT OFFICE.

O. N. BRAINERD, OF MARION, IOWA.

IMPROVED EVAPORATING-PAN FOR SACCHARINE LIQUIDS.

Specification forming part of Letters Patent No. 34,236, dated January 28, 1862.

*To all whom it may concern:*

Be it known that I, O. N. BRAINERD, of Marion, in the county of Linn and State of Iowa, have invented a new and Improved Apparatus for Defecating and Evaporating Saccharine Liquids; and I do hereby declare that the following is a full, clear, and exact description of the same, reference being had to the accompanying drawings, forming a part of this specification, in which—

Figure 1:
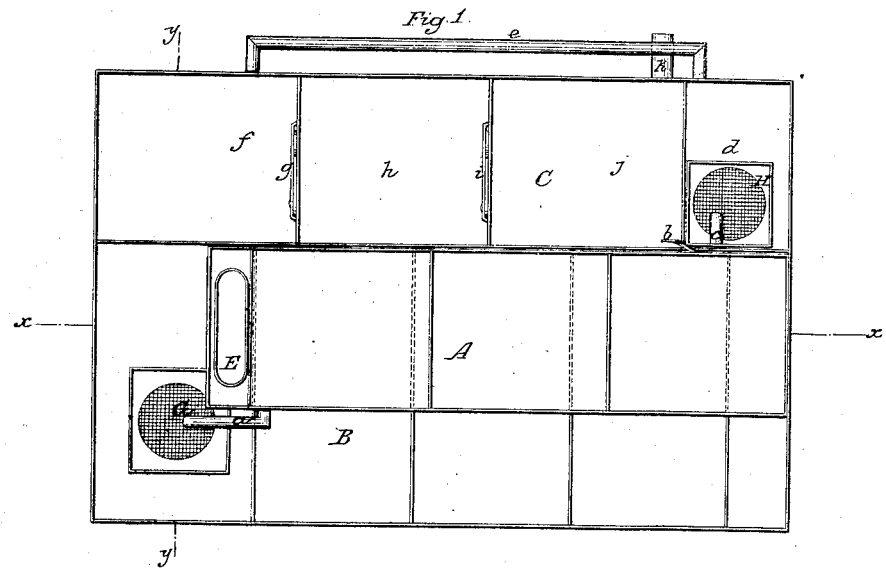
Figure 2:
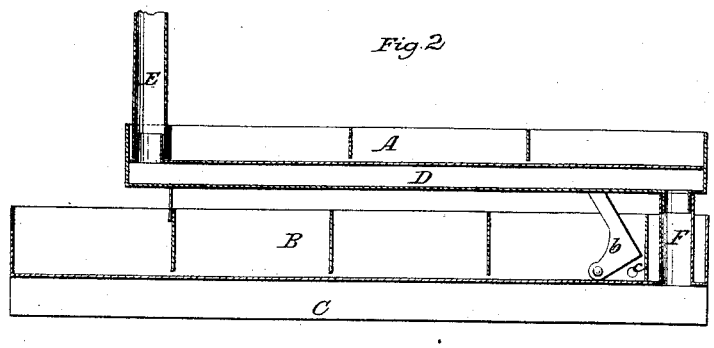
Figure 3:
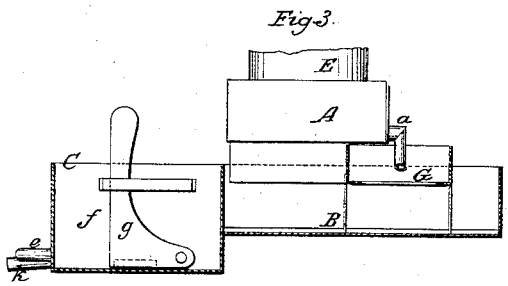

Figure 1 represents a plan or top view of my invention. Fig. 2 is a longitudinal vertical section of same, the line $x\ x$, Fig. 1, indicating the plane of section. Fig. 3 is a transverse vertical section of the same, taken in the plane indicated by the line $y\ y$, Fig. 1.

Similar letters of reference in the three views indicate corresponding parts.

This invention consists in the arrangement of two pans, one on the top of the other, in combination with a flue running alongside of the bottom of the upper pan, and consequently on the top of the lower pan, in such a manner that the heat passing through said flue serves to heat simultaneously the contents of the upper and those of the lower pan; also, in the arrangement of two strainers, in combination with three pans placed at different levels and divided into a number of compartments in such a manner that the juice in passing from one pan to the next succeeding one is strained and freed from curdles, bits of cane, and other impurities that may be mixed up with it, while at the same time said juice is gradually boiled down, so that the same passes off from the last compartment of the last pan perfectly clear and finished.

To enable those skilled in the art to make and use my invention, I will proceed to describe it with reference to the drawings.

Three pans, A B C, are connected, the pan A being on the top of the pan B and the pan C on its side and somewhat lower than the same, as clearly shown in Figs. 2 and 3 of the drawings. The upper pan, A, is somewhat shorter than the pan B, and its bottom is made with double walls, so as to form a flue, D, one end of which connects through the pipe E with the chimney, while its other end connects through the pipe F with the flue or furnace under the pan B. By referring to Fig. 2 of the drawings it will be seen that the flue D is situated close over the pan B, so that the hot air passing through said flue simultaneously heats the contents of the upper pan, A, and those of the lower pan, B. By this arrangement a great saving in fuel is effected. The pans are placed in such relation to each other that the juice, after having been boiled in the upper pan and freed from scum, can be conveniently let down into the lower pan, B. The pipe $a$, which serves to let the juice from the upper into the lower pan, empties into a strainer, G, that is situated in the first or highest compartment of the pan B, and after the juice has passed through the several compartments of said pan it is discharged through a gate, $b$, and pipe $c$ into a second strainer, H, that is situated in the first compartment of the pan C. In passing through said strainers the juice is freed from all impurities—such as curdles or bits of cane—which may be mixed up with it, and it passes perfectly clear from the strainer H into the compartment $d$ of the pan C. This compartment, which from the position of the pan is at the lowest point of the same, communicates through the pipe $e$ with the compartment $f$ at the opposite or highest end of the pan, said pipe being inclined so that the juice passes readily from the compartment $d$ into the compartment $f$. From the compartment $f$ the juice passes through the gate $g$ into the compartment $h$, and from this compartment through the gate $i$ into the compartment $j$, from which it is discharged through the pipe $k$. The several compartments of all the pans communicate through openings close at the bottom of the several partitions, and the openings which form the communications between the compartments $f$, $h$, and $j$ of the lowest pan, C, are closed by gates in the usual manner, so that the juice in passing from one compartment to the other is freed from scum, and that by the gates the flow of the juice can be regulated.

What I claim as new, and desire to secure by Letters Patent, is—

1. The arrangement of the pans A and B, in combination with the flue D at the bottom of the former and at the top of the latter, constructed and operating in the manner and for the purpose shown and described.

2. The arrangement of the strainers G H, in combination with the pans A B C, constructed and operating as and for the purpose specified.

O. N. BRAINERD.

Witnesses:
WM. B. ALLEN,
A. E. GRANGER.